(12) United States Patent
Monk et al.

(10) Patent No.: US 9,188,693 B2
(45) Date of Patent: Nov. 17, 2015

(54) METHOD FOR ACQUIRING MARINE SEISMIC DATA

(75) Inventors: David J. Monk, Brazoria, TX (US); Michael S. Bahorich, Houston, TX (US)

(73) Assignee: Apache Corporation, Houston, TX (US)

( * ) Notice: Subject to any disclaimer, the term of this patent is extended or adjusted under 35 U.S.C. 154(b) by 903 days.

(21) Appl. No.: 13/429,719

(22) Filed: Mar. 26, 2012

(65) Prior Publication Data

US 2013/0250720 A1 Sep. 26, 2013

(51) Int. Cl.
*G01V 1/38* (2006.01)
*G01V 1/00* (2006.01)

(52) U.S. Cl.
CPC .............. *G01V 1/3861* (2013.01); *G01V 1/005* (2013.01); *G01V 1/3808* (2013.01); *G01V 2210/127* (2013.01); *G01V 2210/1212* (2013.01); *G01V 2210/1293* (2013.01)

(58) Field of Classification Search
CPC .............................. G01V 1/005; G01V 1/3861
See application file for complete search history.

(56) References Cited

U.S. PATENT DOCUMENTS

| | | | | |
|---|---|---|---|---|
| 4,780,856 A | * | 10/1988 | Becquey | 367/23 |
| 4,953,657 A | | 9/1990 | Edington | |
| 4,958,331 A | * | 9/1990 | Wardle | 367/130 |
| 5,924,049 A | | 7/1999 | Beasley et al. | |
| 6,545,944 B2 | | 4/2003 | de Kok | |
| 6,906,981 B2 | * | 6/2005 | Vaage | 367/21 |
| 7,679,990 B2 | * | 3/2010 | Herkenhoff et al. | 367/23 |
| 7,916,576 B2 | * | 3/2011 | Beasley et al. | 367/38 |
| 7,916,756 B2 | | 3/2011 | Beasley et al. | |
| 8,218,393 B2 | | 7/2012 | Beasley | |
| 8,295,124 B2 † | | 10/2012 | Abma | |
| 8,467,267 B2 | * | 6/2013 | Eick et al. | 367/38 |
| 8,982,663 B2 | * | 3/2015 | Aaron et al. | 367/23 |
| 2004/0013037 A1 | * | 1/2004 | Vaage | 367/21 |
| 2004/0049347 A1 | * | 3/2004 | Fookes et al. | 702/14 |
| 2005/0027454 A1 | * | 2/2005 | Vaage et al. | 702/17 |
| 2008/0285381 A1 † | | 11/2008 | Moldoveanu | |
| 2009/0046536 A1 | * | 2/2009 | Kinkead | 367/21 |
| 2009/0168600 A1 | * | 7/2009 | Moore et al. | 367/38 |
| 2010/0039894 A1 | * | 2/2010 | Abma | 367/52 |

(Continued)

FOREIGN PATENT DOCUMENTS

GB 2390902 A1 1/2004

OTHER PUBLICATIONS

Moldoveannu, N., (2010) Random Sampling: A new strategy for marine acquisition, Proceedings of the 2010 Annual SEG meeting 51-54.

(Continued)

*Primary Examiner* — Ari M Diacou
(74) *Attorney, Agent, or Firm* — Richard A. Fagin

(57) ABSTRACT

A method for acquiring marine seismic data includes towing a seismic energy source in a body of water and towing a seismic sensor at a selected distance from the seismic energy source. The seismic energy source is actuated a plurality of positions, a distance between each of the plurality of actuations being randomly different than any other such distance. Seismic energy detected by the seismic sensor is substantially continuously recorded through a plurality of actuations of the at least one seismic energy source. The recording includes recording a geodetic position of the at least one seismic energy source and the at least one seismic sensor at each actuation.

8 Claims, 5 Drawing Sheets

(56) References Cited

U.S. PATENT DOCUMENTS

| | | |
|---|---|---|
| 2010/0271904 A1 | 10/2010 | Moore et al. |
| 2011/0158041 A1 | 6/2011 | Moldoveanu et al. |
| 2011/0158042 A1* | 6/2011 | Moldoveanu et al. .......... 367/15 |
| 2012/0033525 A1 | 2/2012 | Abma |
| 2012/0081998 A1* | 4/2012 | Almaas et al. .................. 367/23 |
| 2012/0147699 A1† | 6/2012 | Dellinger |
| 2012/0147701 A1* | 6/2012 | Ross et al. ...................... 367/23 |
| 2012/0176861 A1† | 7/2012 | Abma |
| 2012/0230150 A1 | 9/2012 | Sudow et al. |
| 2013/0121109 A1* | 5/2013 | Baardman et al. .............. 367/24 |
| 2014/0269169 A1* | 9/2014 | van Borselen et al. ......... 367/15 |
| 2015/0009780 A1* | 1/2015 | Rommel ......................... 367/24 |
| 2015/0057938 A1* | 2/2015 | Krohn et al. .................... 702/18 |

OTHER PUBLICATIONS

Patent Examination Report No. 1, Australian Patent Application No. 2013205239, May 12, 2014.

Andrew Milton et al., "Reducing acquisition costs with random sampling and multidimensional interpolation," SEG San Antonio 2011 Annual Meeting, 2011, pp. 52-56, XP002714019.

Extended European Search Report from European Patent Application No. 13164443.7, dated Oct. 11, 2013.

Andrew Milton et al., "Reducing acquisition costs with random sampling and multidimensional interpolation," SEG San Antonio 2011 Annual Meeting, 2011, pp. 52-56.

European Search Report, EP13164443, Oct. 11, 2013.

\* cited by examiner
† cited by third party

METHOD FOR ACQUIRING MARINE SEISMIC DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of marine seismic data acquisition. More specifically, the disclosure relates to methods for acquiring marine seismic data in which the positions of seismic energy source(s) used to generate the seismic data are randomly geodetically distributed in order to improve quality of the data obtained.

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in the ocean, one or more air guns or water guns.

Seismic energy which emanates from the source travels through the earth formations until it reaches an acoustic impedance boundary in the formations. Acoustic impedance boundaries typically occur where the composition and/or mechanical properties of the earth formation change. Such boundaries are typically referred to as "bed boundaries". At an acoustic impedance boundary, some of the seismic energy is reflected back toward the earth's surface, where it may be detected by one or more of the seismic sensors deployed on or below the surface when onshore, and in the water when offshore. Other portions of the energy are refracted and continue propagating in a generally downward direction until another impedance boundary is reached. Seismic signal processing known in the art has as an objective the determination of the depths, geographic locations and physical properties of rocks forming a bed boundary below the earth's surface. The depth and location of the bed boundaries is inferred from the travel time of the seismic energy to the acoustic impedance boundaries and back to the sensors at the surface.

Seismic surveying (marine seismic surveying) is performed in bodies of water suck as lakes or the ocean to determine the structure of earth formations below the water bottom. Marine seismic surveying known in the art includes having a vessel tow one or more seismic energy sources, and the same or a different vessel tow one or more "streamers", which are arrays of seismic sensors forming part of or otherwise affixed to a cable. Typically, a seismic vessel will tow a plurality of such streamers arranged to be separated by a selected fixed or variable lateral distance from each other, in a pattern selected to enable relatively complete determination of geologic structures in three dimensions.

The signals detected by the seismic sensors at the earth's surface include components of seismic energy reflected at the bed boundaries, as previously explained. In addition, both coherent noise (noise which has a determinable pattern, such as may be caused by a ship propeller) and incoherent (random) noise may be present. The presence of such noise in the signals received by the seismic sensors reduces the signal-to-noise ratio ("SNR") of the seismic signals of interest. An objective of seismologists, therefore, is to seek methods of eliminating the effects of noise on the signals detected by the sensors without appreciably reducing the true seismic signal component of the detected signals. The resolution of the resultant seismic data is typically dependent on the spatial sampling of the signal and the noise.

Prior art methods which have been used to reduce the effects of noise and acquire a higher quality seismic representation of a particular subsurface structure include using multiple actuations of the seismic source (multiple "firings" or "shots") to record a plurality of sensor measurements from substantially the same subsurface structure, and then summing or "stacking" such measurements to enhance signal strength while substantially reducing the effects of random or incoherent noise. In most such techniques known in the art, the multiple firings are performed such that the source is disposed at regularly spaced positions, and signal processing of the recorded signals follows accordingly.

The idea of random spatial sampling rather than regular spatial sampling of the subsurface has been proposed as a way that can lead to improved resolution of the subsequent data. These design principles and theoretical justification come from a relatively new field of mathematics known as "compressive sampling". See, e.g., Candes, E., Romberg J., and Tao T., (2006) *Stable signal recovery from incomplete and inaccurate measurements*. Communications on Pure and Applied Mathematics 59, 1207-1223. See also, Donoho, D. L., (2006) *Compressed sensing*; IEEE Transactions on Information Theory. 52, 1289-1306.

Typically the approach of random sampling has been suggested as a way to obtain more information from fewer samples and has been considered in a theoretical sense for seismic data. See, Herrman, F., (2009) *Sub-Nyquist sampling and sparsity: how to get more information from fewer samples*, Proceedings of the 2009 Annual SEG meeting 3410-3415.

For land seismic acquisition, it is relatively easy to randomize the spatial positions of shots. Randomizing the positions of sensors is also possible with wireless systems, though more conventional wired systems would limit the potential. The concept of using random sampling in a land environment to get the same result through acquisition of less data has been described in, Milton A., Trickett, S., and Burroughs L., (2011) *Reducing acquisition costs with random sampling and multi-dimensional interpolation*, Proceedings of the 2011 Annual SEG meeting 52-56.

In the marine environment seismic data are typically acquired in straight lines with a set of sensors towed behind the vessel. There is in effect no capability to vary the relative positions of the sensors as these are constrained within a streamer towed behind the vessel. Some natural randomization of sensor positions may occur simply through the deviation of the streamers from the intended track due to currents, but the spacing of the sensor positions within the streamer is fixed.

Marine seismic sources are typically fired sequentially and alternately (in the case of 2 sources and a single vessel), with the objective of firing the sources at regularly spaced locations along a designated vessel track. There are known deviations from this practice known in the art involving the number of sources being activated, and the timing of the source activation.

A first technique known in the art is that multiple sources are fired sequentially with small deviations in timing between firings in each sequence. See, e.g., U.S. Pat. No. 6,906,981 B2 issued to Vaage, entitled, *Method and system for acquiring* marine seismic data using multiple sources. The method disclosed in the foregoing patent still has as an objective acquiring seismic data on a regular spatial sampling basis and recording the data into discrete records of fixed time duration. By introducing slight variations in the actuation timing of the secondary source some variation in the position of the second source is obtained, however such position randomization is relatively small. The purpose of the technique disclosed in the foregoing patent is to achieve randomization of source firing timing so that essentially simultaneously operated sources can have their energy individually identified and separated from the recorded seismic signals in a single discrete record. Note that for purposes of identifying the source position, the sources are actuated at essentially the same time, and at regularly spaced apart spatial positions.

Another technique known in the art provides that the track of the vessel not be straight, but be approximately circular. This essentially creates a pseudo random set of resultant source positions, but the seismic energy sources are still fired at regular spatial intervals along the vessel track. This is described in, Moldoveannu, N., (2010) *Random Sampling: A new strategy for marine acquisition*, Proceedings of the 2010 Annual SEG meeting 51-54. Note however, that using the foregoing technique the source positions are not randomized along the vessel track, but it is simply a result of the fact that the vessel track is not straight that results in spatial variation of the source position.

What is needed is a technique to randomize seismic energy source position for marine seismic data acquisition to obtain the benefits thereof.

SUMMARY

One aspect is a method for acquiring marine seismic data including towing a seismic energy source in a body of water and towing a seismic sensor at a selected distance from the seismic energy source. The seismic energy source is actuated at a plurality of positions, a spatial distance between each of the plurality of actuations being randomly different than any other such spatial distance. Seismic energy detected by the seismic sensor is substantially continuously recorded through a plurality of actuations of the at least one seismic energy source. The recording includes recording a geodetic position of the at least one seismic energy source and the at least one seismic sensor at each actuation.

Other aspects and advantages of the disclosure will be apparent from the description and claims which follow.

DETAILED DESCRIPTION

In the description below, the term "seismic source" is used to describe a set of seismic energy sources such as air guns and water guns which are fired substantially simultaneously. Such a seismic source, known as an "array" will normally include several air guns or water guns, but might also consist of only one such gun, or one gun in one or more of a plurality of "sub-arrays". A seismic vessel will typically tow one, two or more seismic source arrays which are actuated ("fired") at separate times. In some of following description two sources are used. It should be clearly understood, however, that a method and system according to various examples can use single sources or more than two sources on each vessel. Also, it is not necessary that all vessels, operating together, tow the same number of sources.

Figure 1:
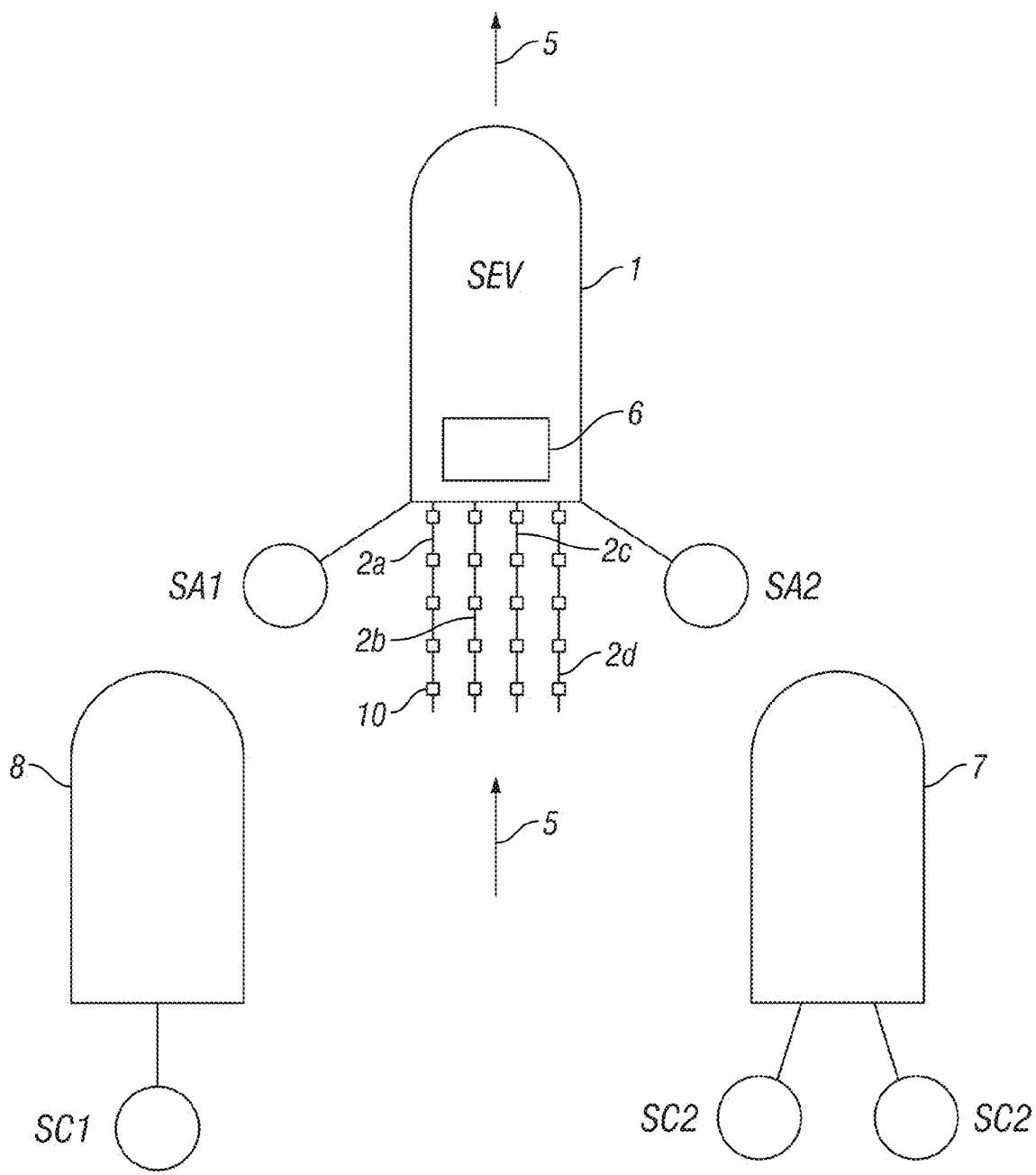
FIG. 1 is a diagram of one embodiment of a marine seismic acquisition system.

FIG. 1 shows an example of a marine seismic data acquisition arrangement which may be used in example implementations. A seismic vessel (SEV) 1 tows the first seismic sources SA1, SA2, and one or more "streamers" or seismic sensor arrays as shown at 2a-2d. Each streamer 2a-2d includes a plurality of seismic sensors (typically hydrophones) disposed thereon at spaced apart locations along each streamer 2a-2d. The seismic sensors are shown generally at 10. The streamers 2a-2d are disposed along lines substantially parallel to the survey line 5. For purposes of the present examples, only one streamer need be towed by the SEV 1, however, having a plurality of streamers as shown in FIG. 1 may improve the efficiency and speed of data acquisition, as is known in the art. The seismic sensors 10 in the streamers 2a-2d are operatively coupled to a recording system 6 that may be disposed on the SEV 1.

The seismic recording system 6 may also include navigation equipment (not shown separately) to enable precisely determining the position of the SEV 1 and/or other vessels and the individual sensors 10 as seismic signals are recorded. The seismic recording system 6 may also include a source controller which selectively controls actuation of the one or more sources towed by the SEV 1 and by any additional vessels, such as shown in FIGS. 1 at 7 and 8 and further explained below. Source actuation by the source controller (not shown separately) will be further explained.

Each of the seismic sources SA1, SA2, in this example, as previously explained, will typically include an array of air guns, or several sub arrays, as will be explained further below. Such arrays are used, for among other reasons as is known in the art, to provide "whiter" seismic energy (including a broader range of frequencies and having a more nearly constant amplitude for such frequencies). In other embodiments, the seismic acquisition system may include additional source vessels, shown generally at 7 and 8 in FIG. 1. These additional source vessels 7, 8 may each tow one or more additional seismic sources or arrays thereof, shown generally at SC1 and SC2. The additional source vessels and sources may be omitted in some examples.

The first SA1, SA2 and second SC1, SC2 seismic energy sources may be used in marine seismic surveying to increase the coverage area of the seismic data recorded by the recording system 6. Typically, each of the sources SA1, SA2, SC2, SC2 will be actuated in a sequence involving consecutive and sequential activations which reduces interference between sources in the recorded signals. For purposes of the description which follows of example methods, a "first source" can be either one of the sources towed by the SEV 1, these being sources SA1 and SA2. A "second source" referred to in the description can be any other source towed either by SEV1 or any other source vessel e.g., as shown at 7 and 8.

It should also be understood that for purposes of defining the scope of the disclosure, it is not necessary to have a separate source vessel, or source vessels, to tow the second source (or any additional sources) as shown in FIG. 1, although having such a separate source vessel provides practical benefits such as increasing the effective subsurface coverage of the streamers 2a-2d, as is known in the art. For purposes of defining the scope of this invention, it is only necessary to have one seismic energy source. However, a second seismic energy source (or source array) may be towed by the same vessel or a different vessel along (or parallel to) a survey line, such as 5 in FIG. 1, at a selected distance from the first seismic source (or source array), and the following example uses two sources.

During acquisition of seismic signals, the first sources SA1, SA2 may be fired in a plurality of firing sequences, the positioning of these source activations will be further explained, and signals detected by the sensors (not shown) on the streamers 2a-2d are recorded by the recording system 6.

Figure 2:
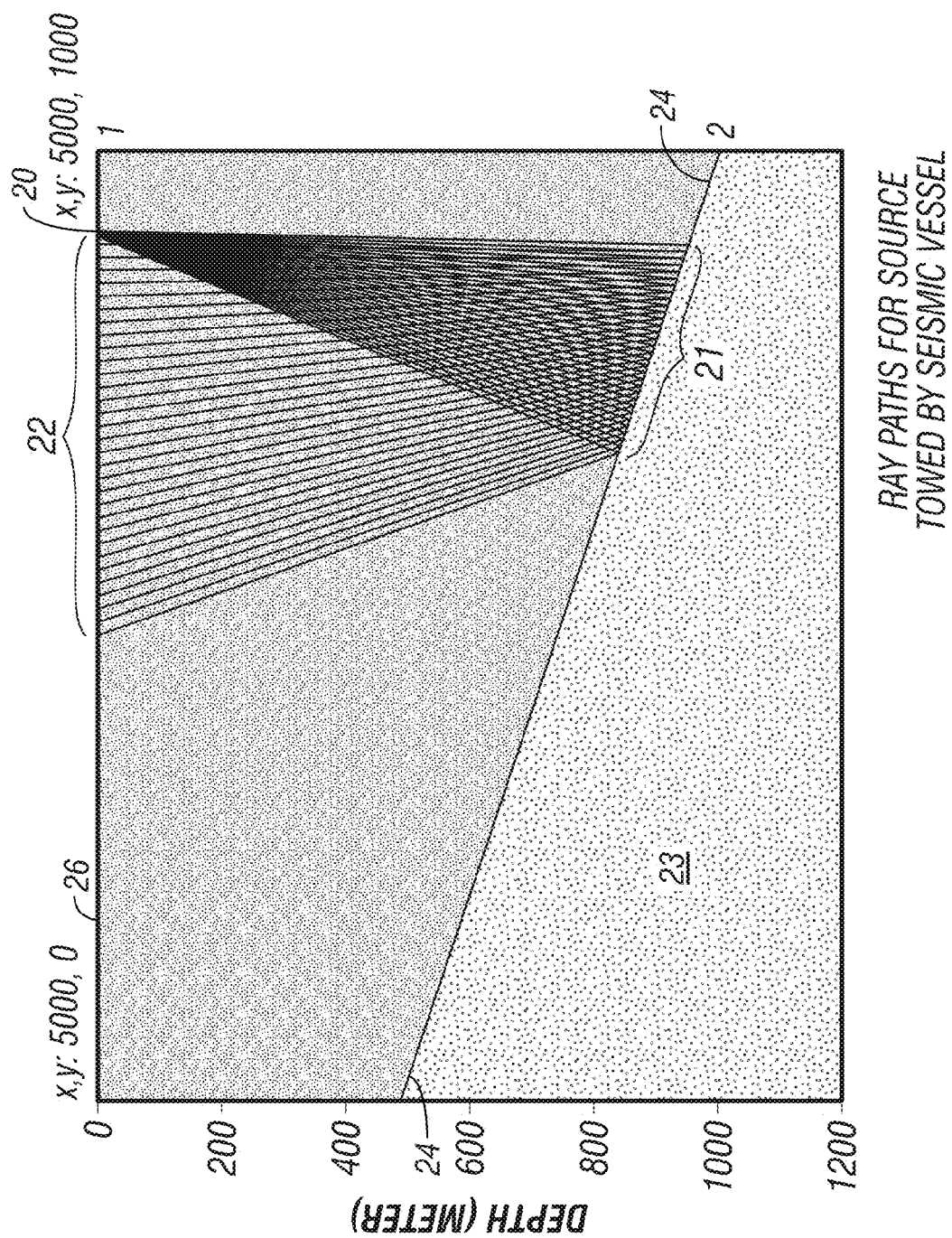
FIG. 2 shows an example of seismic energy paths (ray paths) from a source to a plurality of seismic sensors towed by a vessel as the seismic energy reflects from an acoustic impedance boundary.

FIG. 2 shows an example of paths 21 ("ray paths") of seismic energy as it travels from the first source or source arrays (SA1 in FIG. 1), the location along the survey line (5 in FIG. 1) of which is shown at 20, downward through the water 26, to a subsurface acoustic impedance boundary (bed boundary) 24. Some of the seismic energy is reflected from the bed boundary 24 and travels upwardly through the water 26 where it is detected by the sensors on each of the streamers (2a-2d in FIG. 1), the locations of some of which are shown at 22. The ray paths 21 shown in FIG. 2 correspond to the path traveled by the seismic energy to each tenth sensor in one of the streamers (2a-2d in FIG. 1).

The present example provides a method of acquiring marine seismic data where the source positions between successive actuations are randomized in distance along the vessel heading (direction of vessel motion). This randomization is possible in a direction parallel to the vessel heading (and thus the source heading) and additionally, by manipulation of certain components of the seismic source array used in some examples, may be randomized to some extent in the direction perpendicular to the vessel heading. Randomization of source position may be obtained, for example, by firing the sources at randomly spaced apart actuation ("firing") time intervals between successive source actuations.

Because the source(s) are fired at random spacing between actuations, if the vessel speed is constant, the seismic sensor signals will be acquired at different time intervals, and as a result the sensor signals generally cannot be recorded in a conventional manner as a set of discrete records of the same length indexed to the source actuation time. In the present example, continuous recording of the sensor signals may be used, and sequential seismic data records for each source actuation, some of which may overlap in time, can be extracted from the continuous signal recordings. Any part of or all of the recordings may or may not contain interfering energy from a subsequent or prior source actuation, which will depend on the variation in time between source actuations, and resulting source and sensor positions at the time of source actuation.

Figure 3:
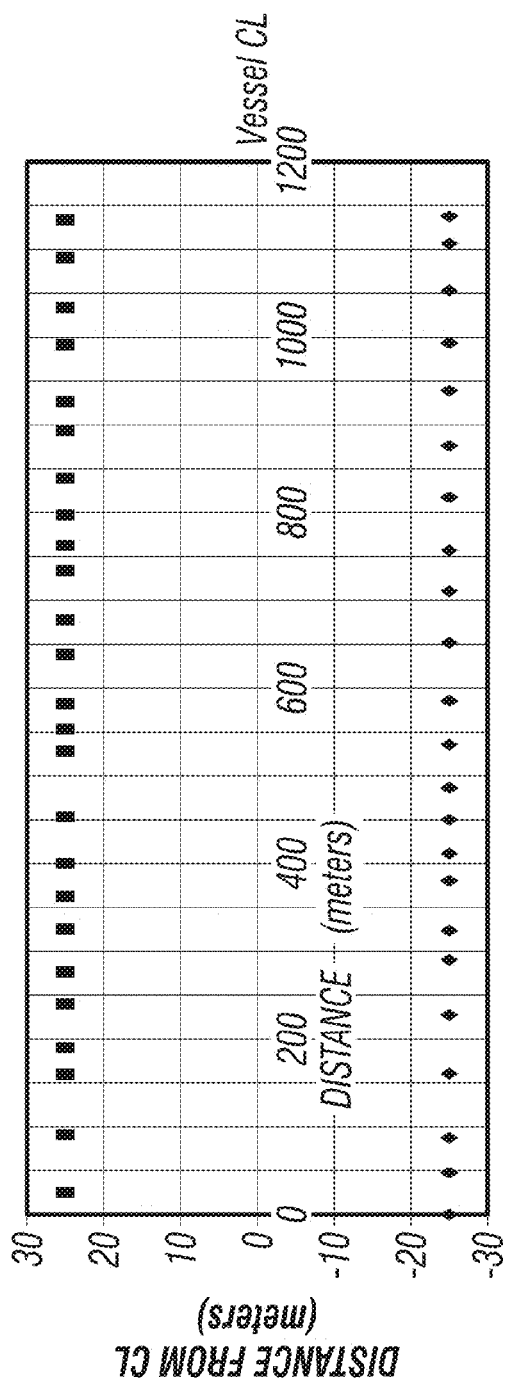
FIG. 3 shows positions of seismic energy sources wherein a distance between successive actuations occurs randomly.

FIG. 3 illustrates the source locations, e.g., those of SA1 and SA2 in FIG. 1, where the distance between positions of the sources at the time of actuation is varied randomly along the vessel direction of motion (e.g., 5 in FIG. 1) by selecting randomly changing separations in distance between successive source actuations. The source positions at each actuation are indicated by the square (for SA1) and diamond (for SA2) symbols. Preferably the time interval between successive source actuations is always large enough to ensure that the compressor capability is adequate to ensure that the sources are fully charged before actuation. In the present example illustration a minimum time interval between successive source actuations of 6 seconds is used. However, the difference in time interval between successive source actuations should be large enough so that the distance between source positions at the respective actuation times is large enough to be detectable. In one example, a mean number of source actuations along a selected travel distance (e.g., 5 to 10 kilometers) using random spatial activation positions between source actuations may be the same as an average number of source actuations using a same spatial interval between successive actuations (i.e., using the technique known in the art having regular source position spacing between actuations).

Using the foregoing source actuation technique it would be difficult to record complete, discrete records of the detected seismic energy from each source actuation. Recording of the detected seismic energy in the present example is facilitated by continuous recording of detected seismic signals. Individual source actuation ("shot") records may or may not overlap in time depending on the actual positions at which the respective seismic sources are actuated.

Another possible implementation of source position spacing randomization may include actuation of particular air guns within the source array. It is known in the art for each source array (e.g., SA1, SA2 in FIG. 1) to be composed of several (typically 3) "sub arrays" which are deployed with a selected separation in the direction perpendicular to the vessel heading. Such separation is typically 10 meters. In conventional seismic data acquisition all subarrays are typically activated simultaneously; however if a smaller source energy is sufficient for the acquisition of suitable seismic signals, then not all of the subarrays need to be activated simultaneously for each shot. As an alternate configuration, extra sub arrays may be deployed wherein not all of them are actuated for each particular shot.

Figure 4:
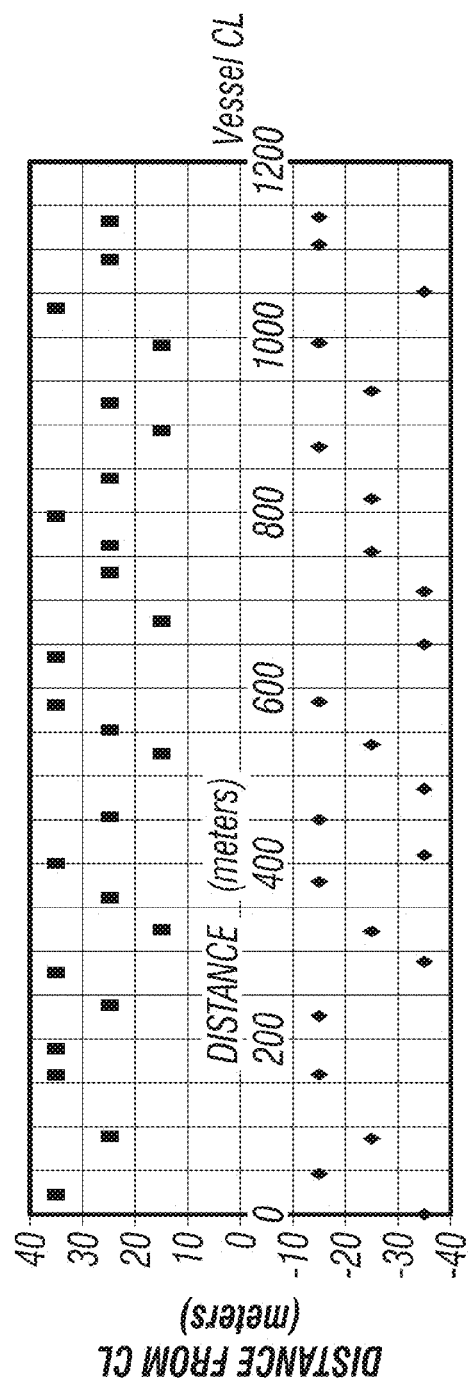
FIG. 4 shows positions of seismic energy source sub arrays wherein a distance between successive actuations occurs randomly.
Figure 6:
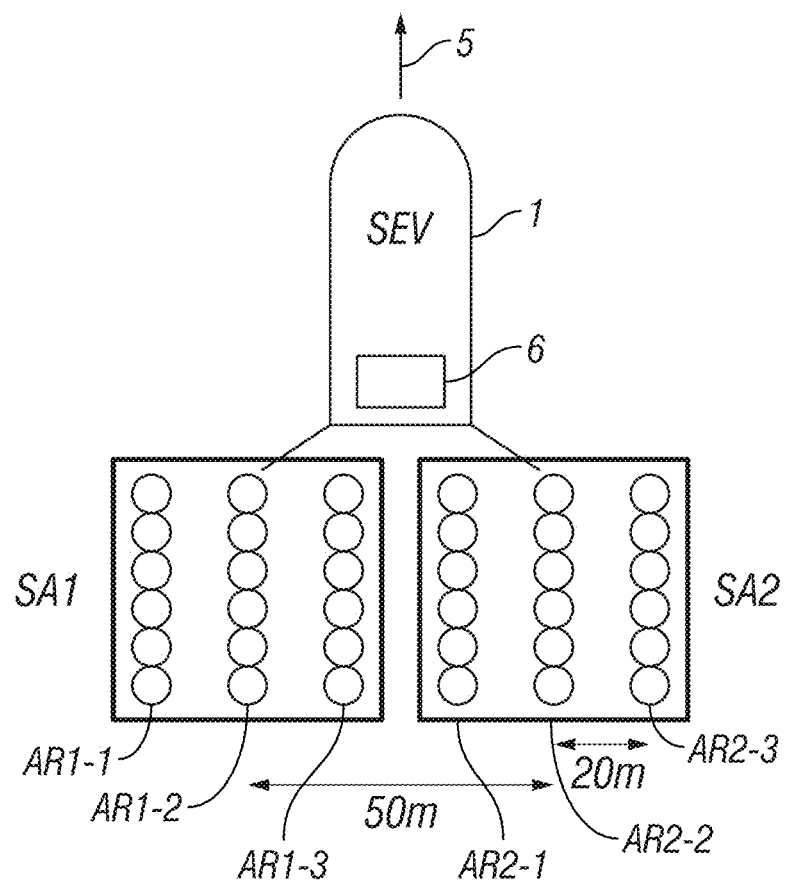
FIG. 6 shows an example of seismic energy source arrays each comprising a plurality of sub arrays.

To illustrate the foregoing concept, the source array (e.g., SA1 and SA2 in FIG. 1), and referring to FIG. 6, the source array SA1 may be considered to be composed of, for example, three sub arrays, AR1-1, AR1-2, AR1-3 separated from each other laterally (transverse to the vessel heading) by, for example, 20 meters. Corresponding sub arrays are shown at AR2-1, AR2-2 and AR2-3 for the second source array SA2. It would therefore be possible to activate the center (AR1-2) and port (AR1-1) sub array, the center (AR1-2) and starboard (AR1-3) sub array, or the two outer (port and starboard sub arrays (AR1-1 and AR1-3). If the sub arrays are substantially identical in configuration, and sufficiently laterally separated such that there is negligible interaction between them when actuated, then the same far field vertical energy signature would result from each combination of activated sub arrays, but the effective position of the source would vary in a direction perpendicular to the vessel track 5. If the actuations were determined on a random basis, then each source composed of 3 sub arrays may be activated in one of 3 possible crossline positions in a random sequence. Randomization of both the inline and crossline positions of the effective array could now be achieved. The foregoing is illustrated in FIG. 4. The sub array position at the time of each actuation is shown by the square and diamond symbols in FIG. 4. It should be noted that 3 sub arrays is not a limit to the configuration of the source array, and more subarrays may be deployed in other implementations. Using more sub arrays increases the number of possible activation positions of the source.

Following the acquisition of continuous data records using randomly spatially distributed source actuations there may be a need for extraction of the recorded signal data to convert the data to discrete "shot" records for subsequent processing. Such extraction and conversion will restore the recorded signals to a time index of zero and source/sensor geodetic positions existing at the time of each source actuation (firing).

Note that the selected time limit of the extracted recordings can be any selected value. There is essentially no limit to the extracted recording length. It can be short or long. The longer the recording time is the more overlapping data from multiple source activations, and consequent interfering data, there are likely to be.

Figure 5:
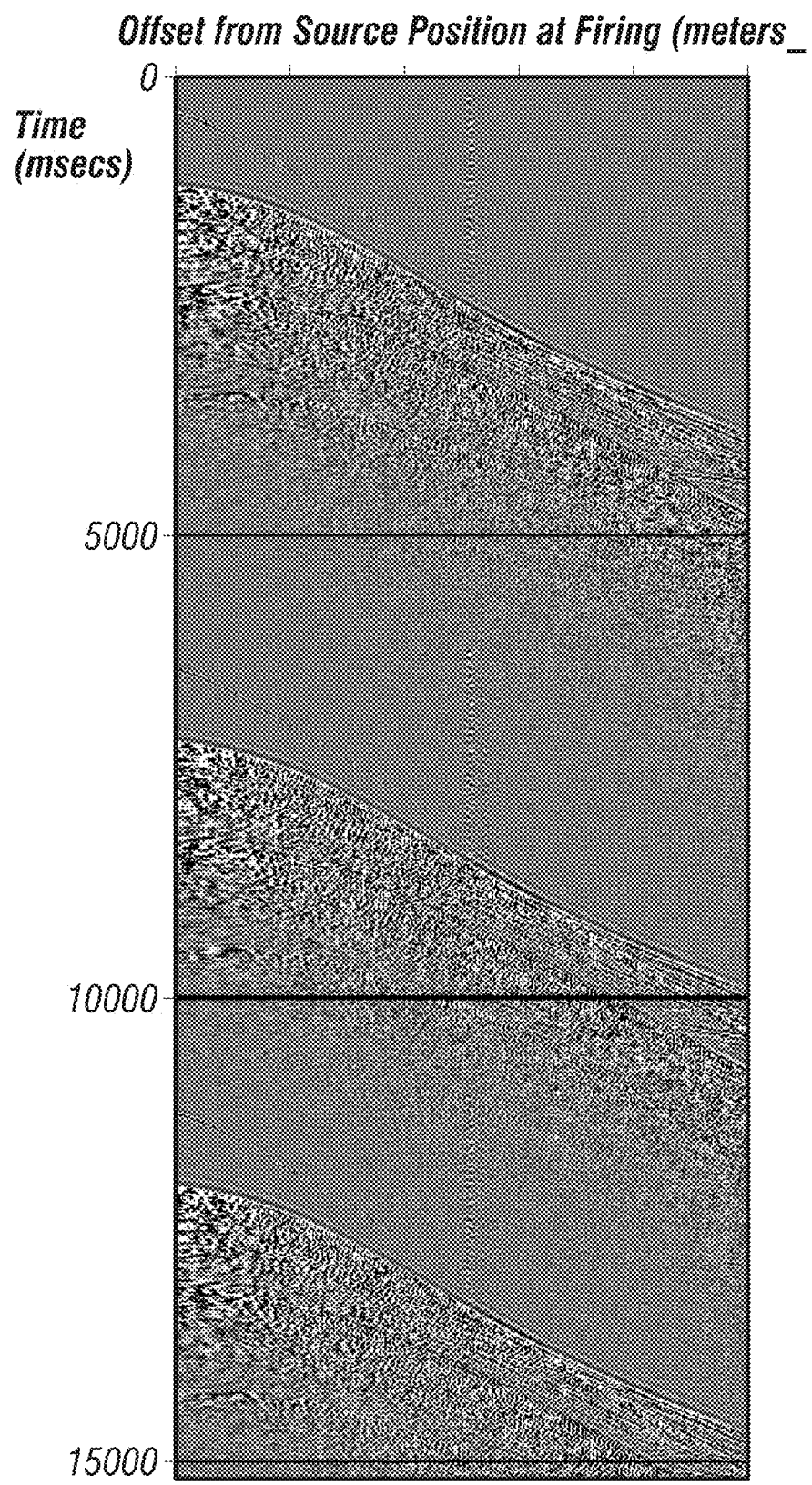
FIG. 5 shows an example of continuous signal recording during multiple source actuations.

While a single source cannot be activated more frequently than is possible in view of the compressed gas source (compressor) capability where air guns are used, this time is often less that the time it takes to traverse the regular source activation distance. When activating the sources at randomized spatial positions, it is possible that a second source may be activated twice before the first source is activated again. If the compressors can fill an entire air gun array in, for example, 6 seconds, it is therefore possible, for example, if 4 sources are deployed, to have all 4 sources activated within a 6 second time window. TABLE 1 illustrates a series of activation positions based on random sampling and the associated firing times for the sources. The basis for source actuation is that the sources would normally be fired on a regular 25 meter interval "flip flop" scheme (i.e. each source is fired every 50 meters). In the present example the sources are actuated randomly in space (and thus in time) but with the same average shot density (number of actuations over a selected length of travel of the source towing vessel). An example of a section of a long continuous record with a plurality of source firings spaced at random intervals is shown in FIG. 5.

A first step in computing discrete shot records from a continuous data recording would be to extract fixed time records (which may or may not overlap) from the continuous signal recording. Each time record may be initiated at the time of a source being activated. There may or may not be interfering source energy from previous or subsequent source actuations. For short shot record lengths, that is the length of time between source actuation and the last signal recorded at the most distance seismic sensor (e.g., four seconds or less) there will be very few interfering signals, and for long shot record lengths (e.g., ten seconds or more) there will be more.

Data from interfering records may be removed, for example, by sorting the data to a common sensor or common midpoint trace arrangement where the interfering data will be random, and can then be attenuated by conventional noise attenuation processes, for example, F-X deconvolution.

There are several issues to be considered in the present method. The first is that the data recorded from actuation of one source may have interfering energy from other sources present. The interfering energy may be expected to be random with respect to each record for two reasons. The first is that the source has been activated in a spatially random sense. Therefore, the same source may be fired again before the end of the record generated by the first firing. The interfering energy may be from the subsequent or prior actuation of a single source, but may also be from a second source. The second reason is that the interfering source has also been activated with random intervals between actuations of the first source.

Following a conventional processing step of attenuating random noise, the data will still be distributed randomly in space, that is, the seismic sensor locations at the time of energy detection will be spatially distributed in essentially the same manner as the source positions. At this stage, the recorded data may be interpolated to finer spatial positions on regular interval spacing for further processing. The interpolation and regularization should also be expected to attenuate residual energy that is not coherent. Typical regularization techniques (See, Sheng Xu and Yu Zhang (2010) *Seismic data regularization for marine wide azimuth data*, Proceedings of the 2010 annual meeting, Society of Exploration Geophysicists), may include interpolation over several different dimensions/directions such as; common sensor, common source, common offset, common depth point and time. Interfering energy in any seismic sensor record will only be coherent in the common shot domain.

An example of the activation positions and times for sources fired in this random spatial position sense is shown below in TABLE 1. Note that the positions are generated randomly, and are not set. Further note that in this example, many of the shots are fired in a way that there is no interfering energy on extracted shots.

TABLE 1

| vessel speed | 4.5 | knots |
| extracted record length | 8 | seconds |
| minimum shot interval | 18.5184 | |
| regular shot interval | 25 | |

| Normal Regular Position | | | | Random Positions | | | |
| --- | --- | --- | --- | --- | --- | --- | --- |
| Source 1 Position | | Source 2 Position | | Source 1 | Siource 2 | Activation Times | |
| x | y | x | y | Y | Y | time1 | time2 |
| 0 | −25 | 25 | 25 | 0 | 25 | 0 | 10.80007 |
| 50 | −25 | 75 | 25 | 33.12853 | 86.36322 | 14.31162 | 37.30915 |
| 100 | −25 | 125 | 25 | 106.4594 | 143.2652 | 45.99075 | 61.89094 |
| 150 | −25 | 175 | 25 | 132.2147 | 168.3899 | 57.11711 | 72.74492 |
| 200 | −25 | 225 | 25 | 183.8826 | 210.5364 | 79.43781 | 90.95232 |
| 250 | −25 | 275 | 25 | 226.8013 | 240.2097 | 97.9788 | 103.7712 |
| 300 | −25 | 325 | 25 | 286.322 | 266.4713 | 123.6919 | 115.1163 |
| 350 | −25 | 375 | 25 | 312.9564 | 340.5364 | 135.198 | 147.1127 |
| 400 | −25 | 425 | 25 | 349.3745 | 376.6552 | 150.9307 | 162.7161 |
| 450 | −25 | 475 | 25 | 415.6553 | 417.7835 | 179.5642 | 180.4836 |
| 500 | −25 | 525 | 25 | 486.0781 | 458.2179 | 209.9871 | 197.9514 |
| 550 | −25 | 575 | 25 | 531.4911 | 494.5444 | 229.6056 | 213.6445 |
| 600 | −25 | 625 | 25 | 585.2791 | 565.7238 | 252.8422 | 244.3943 |
| 650 | −25 | 675 | 25 | 649.8403 | 592.8224 | 280.7328 | 256.1009 |
| 700 | −25 | 725 | 25 | 684.9578 | 637.505 | 295.9037 | 275.4039 |
| 750 | −25 | 775 | 25 | 748.1958 | 696.8316 | 323.2226 | 301.0332 |
| 800 | −25 | 825 | 25 | 796.556 | 756.4485 | 344.1144 | 326.7878 |
| 850 | −25 | 875 | 25 | 868.7287 | 824.3228 | 375.2932 | 356.1097 |
| 900 | −25 | 925 | 25 | 897.8333 | 858.0764 | 387.8665 | 370.6914 |

TABLE 1-continued

| | | | | | | | |
|---|---|---|---|---|---|---|---|
| 950 | −25 | 975 | 25 | 948.2315 | 911.4307 | 409.6386 | 393.7406 |
| 1000 | −25 | 1025 | 25 | 1010.093 | 941.9803 | 436.3629 | 406.9381 |
| 1050 | −25 | 1075 | 25 | 1071.264 | 1006.485 | 462.7888 | 434.8043 |
| 1100 | −25 | 1125 | 25 | 1122.44 | 1075.195 | 484.8973 | 464.4873 |
| 1150 | −25 | 1175 | 25 | 1155.968 | 1126.908 | 499.3813 | 486.8276 |
| 1200 | −25 | 1225 | 25 | 1227.983 | 1168.112 | 530.4919 | 504.6276 |

Actuation of a seismic energy source using random spatial positions between successive source actuations may provide improved seismic data quality than that using conventional, regular spatial source activations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for acquiring marine seismic data, comprising:
    towing at least one seismic energy source in a body of water;
    actuating the at least one seismic energy source at a plurality of spatial positions, a distance between each of the plurality of actuations being randomly different than any other distance, the difference between successive distances being sufficiently large to enable detection of corresponding differences between a position of the at least one seismic energy source corresponding to each actuation using detected seismic signals;
    recording seismic energy detected by at least one seismic sensor substantially continuously through a plurality of actuations of the at least one seismic energy source, the recording comprising recording a geodetic position of the at least one seismic energy source and the at least one seismic sensor at each actuation; and
    processing the recorded seismic energy into a discrete shot record comprising a trace corresponding to a recorded signal at an actual position of the at least one seismic energy source and the at least one sensor at each actuation.

2. The method of claim 1 further comprising actuating at least a second seismic energy source towed in the body of water at a known positional relationship with respect to the at least one seismic energy source; actuating the at least a second seismic energy source, a distance between each of the plurality of actuations being randomly different than any other such distance; and recording seismic energy detected by a plurality of seismic sensor substantially continuously through a plurality of actuations of the at least one seismic and at least a second energy source, the recording comprising recording a geodetic position of the seismic energy sources and the seismic sensors at each actuation.

3. The method of claim 1 further comprising extracting seismic signals from the recorded seismic energy corresponding to individual actuations of the at least one seismic energy source.

4. The method of claim 3 wherein the extracting comprises sorting the recorded seismic energy to at least one of common sensor position records and a common midpoint position records and attenuating energy in such records resulting from interfering source actuations by a random noise attenuation process.

5. The method of claim 4 wherein the random noise attenuation process comprises F-X deconvolution.

6. The method of claim 1 wherein the at least one seismic energy source sources comprises a plurality of similarly configured sub arrays, wherein a subset of the plurality of sub arrays is actuated at each actuation spatial position.

7. The method of claim 6 wherein each subset is selected on a random basis so that an effective position of the at least one seismic energy source is varied in a direction perpendicular to a direction of the towing between successive actuations of the at least one seismic energy source.

8. The method of claim 1 wherein the at least one seismic sensor is towed through the body of water.

* * * * *